US009075485B2

(12) United States Patent
Tsai et al.

(10) Patent No.: US 9,075,485 B2
(45) Date of Patent: Jul. 7, 2015

(54) TOUCH DISPLAY PANEL AND TOUCH SENSING SUBSTRATE

(75) Inventors: Chang-Hsiao Tsai, Taipei County (TW); Chih-Hsiang Ho, Hualien County (TW)

(73) Assignee: AU OPTRONICS CORPORATION, Hsinchu (TW)

( * ) Notice: Subject to any disclaimer, the term of this patent is extended or adjusted under 35 U.S.C. 154(b) by 981 days.

(21) Appl. No.: 12/702,302

(22) Filed: Feb. 9, 2010

(65) Prior Publication Data

US 2011/0134052 A1 Jun. 9, 2011

(30) Foreign Application Priority Data

Dec. 9, 2009 (TW) .............................. 98142140 A (51) Int. Cl.
*G06F 3/044* (2006.01)
(52) U.S. Cl.
CPC ...................................... *G06F 3/044* (2013.01)
(58) Field of Classification Search
CPC .......... G06F 3/044; G06F 2203/04104; G06F 2203/04107; G06F 2203/04112; G06F 2203/04113
USPC .................................. 345/156, 157, 173, 174
See application file for complete search history.

(56) References Cited

U.S. PATENT DOCUMENTS

2007/0222766 A1* 9/2007 Bolender ....................... 345/173
2011/0025636 A1* 2/2011 Ryu et al. ...................... 345/173

FOREIGN PATENT DOCUMENTS

WO WO2009145485 * 4/2009 .............. G06F 3/041

* cited by examiner

*Primary Examiner* — William Boddie
*Assistant Examiner* — Jeffrey A Parker
(74) *Attorney, Agent, or Firm* — WPAT, PC; Justin King (57) ABSTRACT

A touch display panel including a flat display panel and a touch sensing device disposed on the flat display panel is provided. The touch sensing device includes a plurality of the center sensing series and at least a margin sensing series corresponding to the display area of the flat display panel. Each center sensing series is formed by a plurality of center sensing electrodes serially connected. The margin sensing series disposed along the margin of the display area is formed by a plurality of margin sensing electrodes serially connected. Each of the margin sensing electrodes includes an inner portion and a rectangular outer portion. An area of the inner portion is substantially half of an area of the center sensing electrode. A parallel hemline is formed by the rectangular outer portions serially connected.

22 Claims, 7 Drawing Sheets

TOUCH DISPLAY PANEL AND TOUCH SENSING SUBSTRATE

CROSS-REFERENCE TO RELATED APPLICATION

This application claims the priority benefit of Taiwan application serial no. 98142140 filed Dec. 9, 2009. The entirety of the above-mentioned patent application is hereby incorporated by reference herein and made a part of specification.

BACKGROUND OF THE INVENTION

1. Field of the Invention

The present invention relates to a touch display panel and a touch sensing substrate, and more particularly to a touch display panel and a touch sensing substrate require merely slim boarder.

2. Description of Related Art

Recently, all types of electronic products are developed toward easy operation, small volume, and large screen and the demands of the volume and the screen size in the portable products are particularly stringent. Therefore, many electronic products combine a touch sensing design into a liquid crystal display panel so as to omit the space for disposing the keyboard or the operation button and enlarge the disposition area of the screen.

At present, the touch panels can be generally classified into capacitive, resistive, infrared, and ultrasonic touch panels, wherein the resistive touch panels and the capacitive touch panels are most popular. In a capacitive touch panel, the facilitation of multi-touch provides much convenient operation mode so that the capacitive touch panel is gradually popular in the market.

Figure 1:
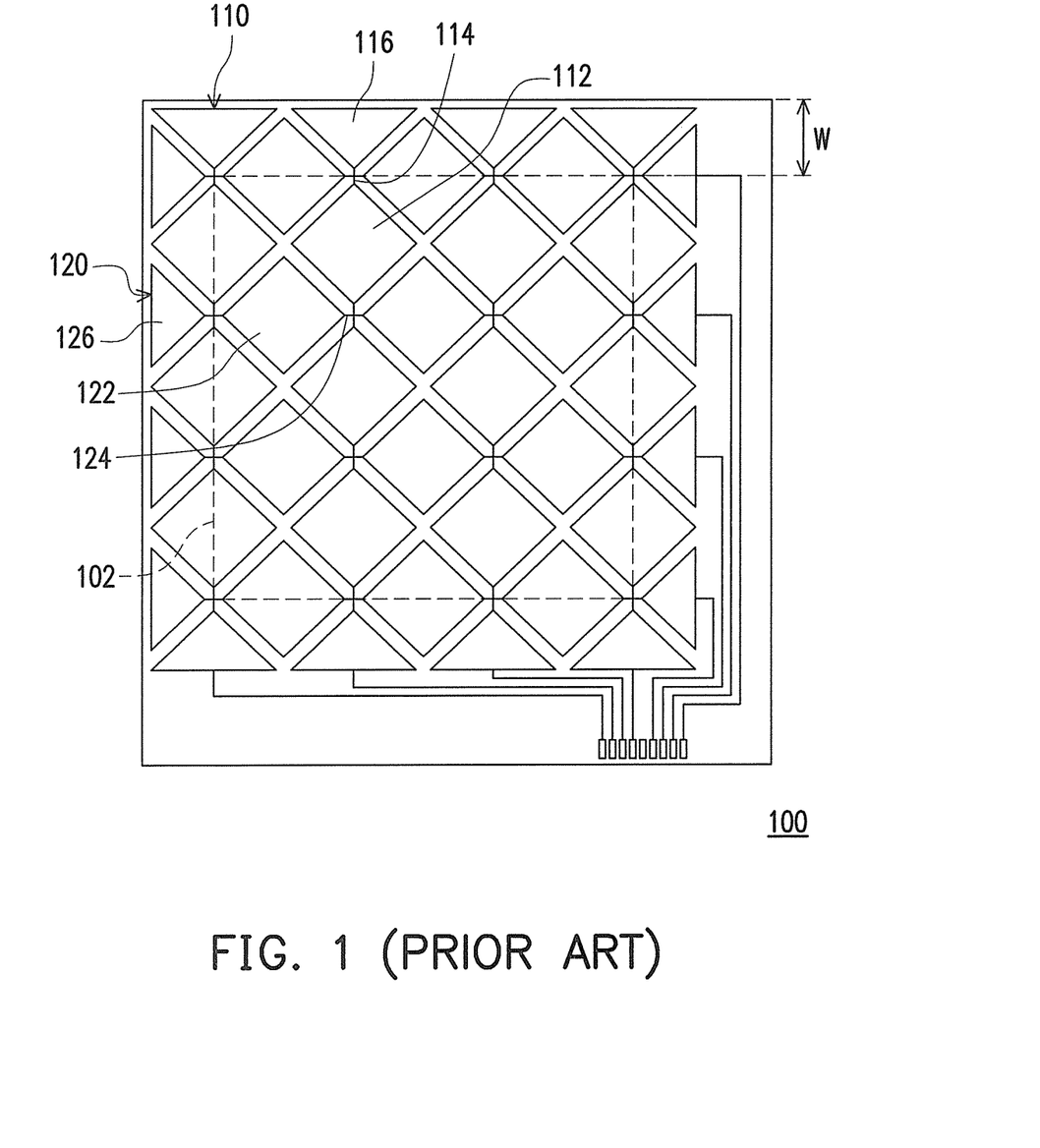
FIG. 1 is a schematic view of a conventional capacitive touch sensing substrate.

FIG. 1 is a schematic view of a conventional capacitive touch sensing substrate. Referring to FIG. 1, a touch sensing substrate 100 has an active area 102 and includes a plurality of first sensing series 110 and a plurality of second sensing series 120. Each of the first sensing series 110 is formed by a plurality of first diamond sensing electrodes 112 serially connected through a plurality of first connecting lines 114. Similarly, each of the second sensing series 120 is formed by a plurality of second diamond sensing electrodes 122 serially connected through a plurality of second connecting lines 124. The area of each first diamond sensing electrode 112 and the area of each second diamond sensing electrode 122 are even equal to each other to accomplish substantially consistent sensibility.

Nevertheless, the active area 102 is in a form of a rectangle. For accomplishing the consistent sensibility of the first diamond sensing electrode 112 and the second diamond sensing electrode 122, portions of the first diamond sensing electrodes 112 of the first sensing series 110 are partially located outside the active area 102. Similarly, portions of the second diamond sensing electrodes 122 of the second sensing series 120 are partially located outside the active 102. Accordingly, the touch sensing substrate 100 requires a larger margin width W outside the active area 102, i.e. a wider border is needed.

On the other hand, for providing even light transmittance in the touch sensing substrate 100, a plurality of first margin electrodes 116 and a plurality of second margin electrodes 126 are further disposed in the touch sensing substrate 100 outside the active area 102. The first margin electrodes 116 and the second margin electrodes 126 are respectively triangular electrode patterns. Accordingly, the electrode patterns are distributed all over the touch sensing substrate 100 to provide even light transmittance. However, the areas of the first margin electrodes 116 and the second margin electrodes 126 are too small to be used for touch sensing such that the active area 102 is incapable of being enlarged. In other words, the margin width W of the touch panel 100 is difficulty reduced.

SUMMARY OF THE INVENTION

The invention is directed to a touch display panel, wherein the margin of the touch sensing device is aligned to or parallel to the margin of the display area to accomplish the slim border design.

The invention is further directed to a touch sensing substrate, wherein the margin sensing series having a parallel hemline provides the touch sensing function and renders the touch sensing substrate to have a slim border.

The invention provides a touch display panel including a flat display panel and a touch sensing device. The flat display panel has a display area and a peripheral area located around the display area. The touch sensing device is disposed on the flat display panel. The touch sensing device includes a plurality of center sensing series and a least a margin sensing series. The center sensing series are disposed corresponding to the display area of the flat display panel. Each of the center sensing series is consisted of a plurality of center sensing electrodes serially connected, wherein the center sensing series include a plurality of first sensing series disposed along a first direction and a plurality of second sensing series disposed along the second direction. The margin sensing series is disposed along a margin of the display area. The margin sensing series is consisted of a plurality of margin sensing electrodes serially connected, and each of the margin sensing electrodes includes an inner portion and a rectangular outer portion. An area of the inner portion is substantially half of an area of the center sensing electrode, and a parallel hemline is formed by the rectangular outer portions serially connected.

According to an embodiment of the invention, a shape of each of the center sensing electrodes is a diamond shape. A length of each of the center sensing electrodes is a, and, a width of the rectangular outer portion is from $a/2$ to $a/2\sqrt{2}$ in each of the margin sensing electrodes, wherein the width is substantially perpendicular to a base of the inner portion.

According to an embodiment of the invention, the at least a margin sensing series includes two first margin sensing series and two second margin sensing series. In addition, the two first margin sensing series are disposed opposite to each other, and the two second margin sensing series are disposed opposite to each other.

According to an embodiment of the invention, the flat display panel further includes a plurality of signal pads and a plurality of signal transmission lines. The signal pads are disposed in the peripheral area, and the signal transmission lines electrically connect the center sensing series and the margin sensing series respectively to the corresponding signal pads. In one embodiment, a part of the transmission lines are located in the display area and disposed between the rectangular outer portions of the margin sensing electrodes and the flat display panel. Meanwhile, the touch display panel further includes an insulation layer disposed between the signal transmission lines and the rectangular outer portions of the margin sensing electrodes.

According to an embodiment of the invention, a material of the margin sensing electrodes is a transparent conductive material. The transparent conductive material includes indium tin oxide (ITO), indium zinc oxide (IZO), or any combination of the foregoing.

According to an embodiment of the invention, the flat display panel is a liquid crystal display panel, a plasma display panel, an organic electro-luminescent display panel or an electrophoretic display panel.

According to an embodiment of the invention, the flat display panel includes a first substrate, a display media, and a second substrate, and the display media is disposed between the first substrate and the second substrate. The center sensing electrodes and the margin sensing electrodes are disposed between the display media and the first substrate.

According to an embodiment of the invention, the touch panel further includes an auxiliary substrate disposed on the flat display panel, and the center sensing series and the margin sensing series are disposed on the auxiliary substrate. The touch display panel further includes an adhesive layer located between the auxiliary substrate and the flat display panel such that the auxiliary substrate is adhered on the flat display panel.

The invention further provides a touch sensing substrate including a substrate, a plurality of center sensing series and at least a margin sensing series. The substrate has a display area and a peripheral area. The peripheral area is located around the display area. The center sensing series are disposed corresponding to the display area of the substrate. Each of the center sensing series is consisted of a plurality of center sensing electrodes serially connected, wherein the center sensing series include a plurality of first sensing series disposed along a first direction and a plurality of second sensing series disposed along the second direction. The margin sensing series is disposed along a margin of the display area. The margin sensing series is consisted of a plurality of margin sensing electrodes serially connected, and each of the margin sensing electrodes includes an inner portion and a rectangular outer portion. An area of the inner portion is substantially half of an area of the center sensing electrode, and a parallel hemline is formed by the rectangular outer portions serially connected.

According to an embodiment of the invention, a shape of each of the center sensing electrodes is a diamond shape. A length of each of the center sensing electrodes is a, and a width of the rectangular outer portion is from $a/2$ to $a/2\sqrt{2}$ in each of the margin sensing electrodes, wherein the width is substantially perpendicular to a base of the inner portion.

According to an embodiment of the invention, the at least a margin sensing series includes two first margin sensing series and two second margin sensing series. The two first margin sensing series are disposed opposite to each other, and the two second margin sensing series are disposed opposite to each other.

According to an embodiment of the invention, the touch sensing substrate further includes a plurality of signal pads and a plurality of signal transmission lines. The signal pads are disposed in the peripheral area, and the signal transmission lines electrically connect the center sensing series and the margin sensing series respectively to the corresponding signal pads. In one embodiment, a part of the transmission lines are located in the display area and disposed between the rectangular outer portions of the margin sensing electrodes and the substrate. Meanwhile, the touch sensing substrate further includes an insulation layer disposed between the signal transmission lines and the rectangular outer portions of the margin sensing electrodes.

According to an embodiment of the invention, a material of the margin sensing electrodes is a transparent conductive material. The transparent conductive material includes indium tin oxide (ITO), indium zinc oxide (IZO), or any combination of the foregoing.

In view of the above, the touch display panel and the touch sensing substrate of the invention have at least a margin sensing series respectively. The margin sensing series forms a parallel hemline capable of parallel to the margin of the display area. Therefore, all the sensing series can be disposed inside the display area, which facilitates the touch display panel and the touch sensing substrate to have slim border. Namely, no dummy margin area which is incapable of sensing for disposing the protruding portion of the sensing electrodes in the touch display panel and the touch sensing substrate is required such that the area utilizations of the touch display panel and the touch sensing substrate are efficiently increased.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2A:
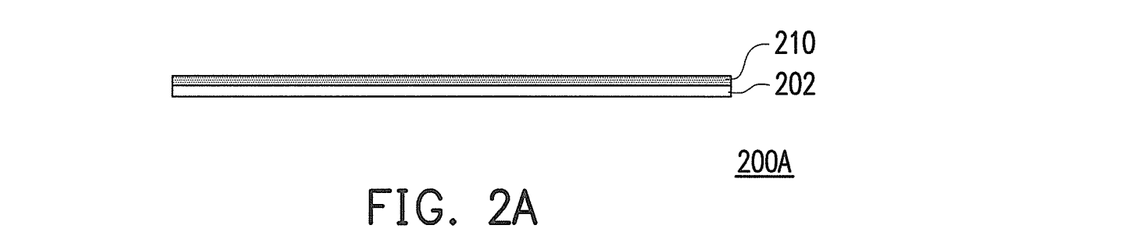
FIGS. 2A through 2C illustrate respectively a touch sensing substrate and two touch display panels according to an embodiment of the invention.
Figure 2B:
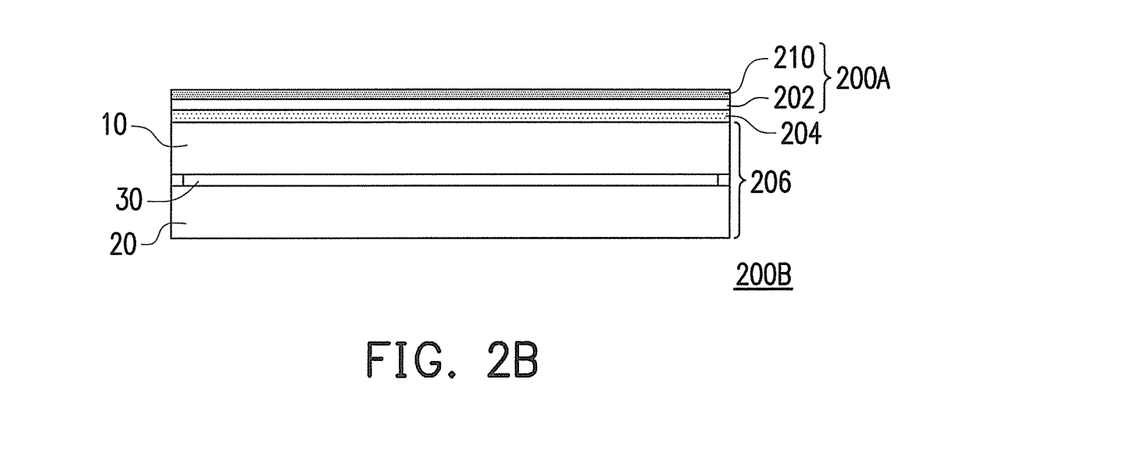
Figure 2C:
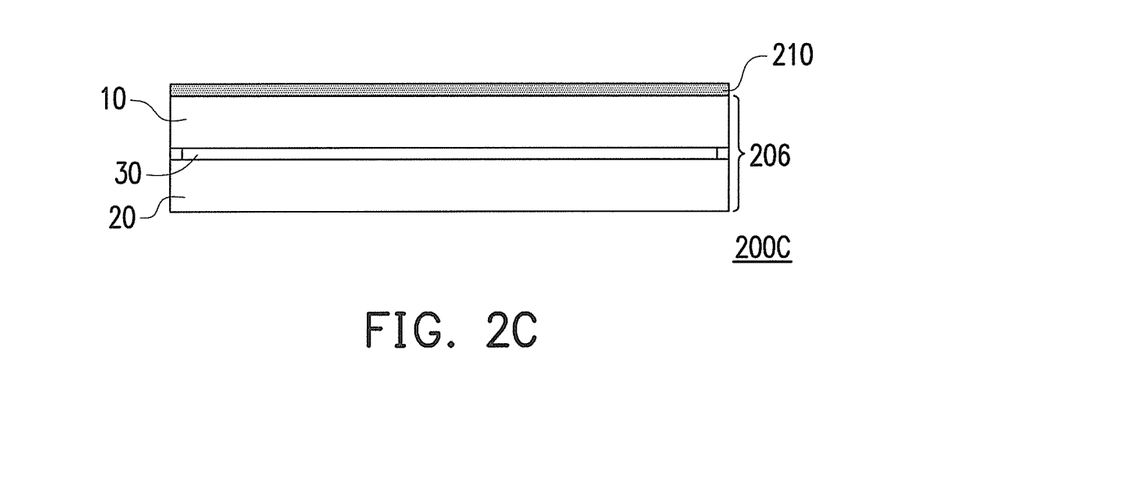

FIGS. 2A through 2C illustrate respectively a touch sensing substrate and two touch display panels according to an embodiment of the invention. Referring to FIG. 2A, the touch sensing substrate 200A includes an auxiliary substrate 202 and a touch sensing device 210 disposed on the auxiliary substrate 202. A touch display panel 200B in FIG. 2B is formed by adhering the touch sensing substrate 200A onto a flat display panel 206 through an adhesive layer 204. The flat display panel 206 is consisted of a first substrate 10, a second substrate 20, and a display media 30 sandwiched between the first substrate 10 and the second substrate 20, for example. Specifically, the flat display panel 206 can be a liquid crystal display panel, a plasma display panel, an organic electro-luminescent display panel, or an electrophoretic display panel. In addition, a touch display panel 200C is formed by directly disposing the touch sensing device 210 in the flat display panel 206 without the adhesive layer 204.

Specifically, the touch sensing device 210 is made by the film deposition process, the photolithography process, etc. Accordingly, the touch sensing device 210 can be formed on an independent substrate such as the auxiliary substrate 202 shown in FIGS. 2A and 2B or any substrate of the flat display panel 206 such as the first substrate 10 or the second substrate 20 shown in FIG. 2C by the aforesaid film deposition process, the photolithography process, etc. If the touch sensing device 210 is directly disposed in the flat display panel 206, the touch sensing device 210 can be formed between the first substrate 10 and the display media 30.

The following descriptions simply introduce a touch sensing substrate to present the design of the touch sensing device of the invention dispose on a substrate. A person who has ordinary skill in the art can clearly and explicitly understand that the teen "substrate" described in the following is not limited to an independent substrate or a substrate of a flat display panel. Namely, the following descriptions of the elements can be applied to the designs in FIGS. 2A through 2C. It is noted that the substrate mentioned herein can be a flexible substrate or a rigid substrate such as a plastic substrate or a glass substrate.

Figure 3:
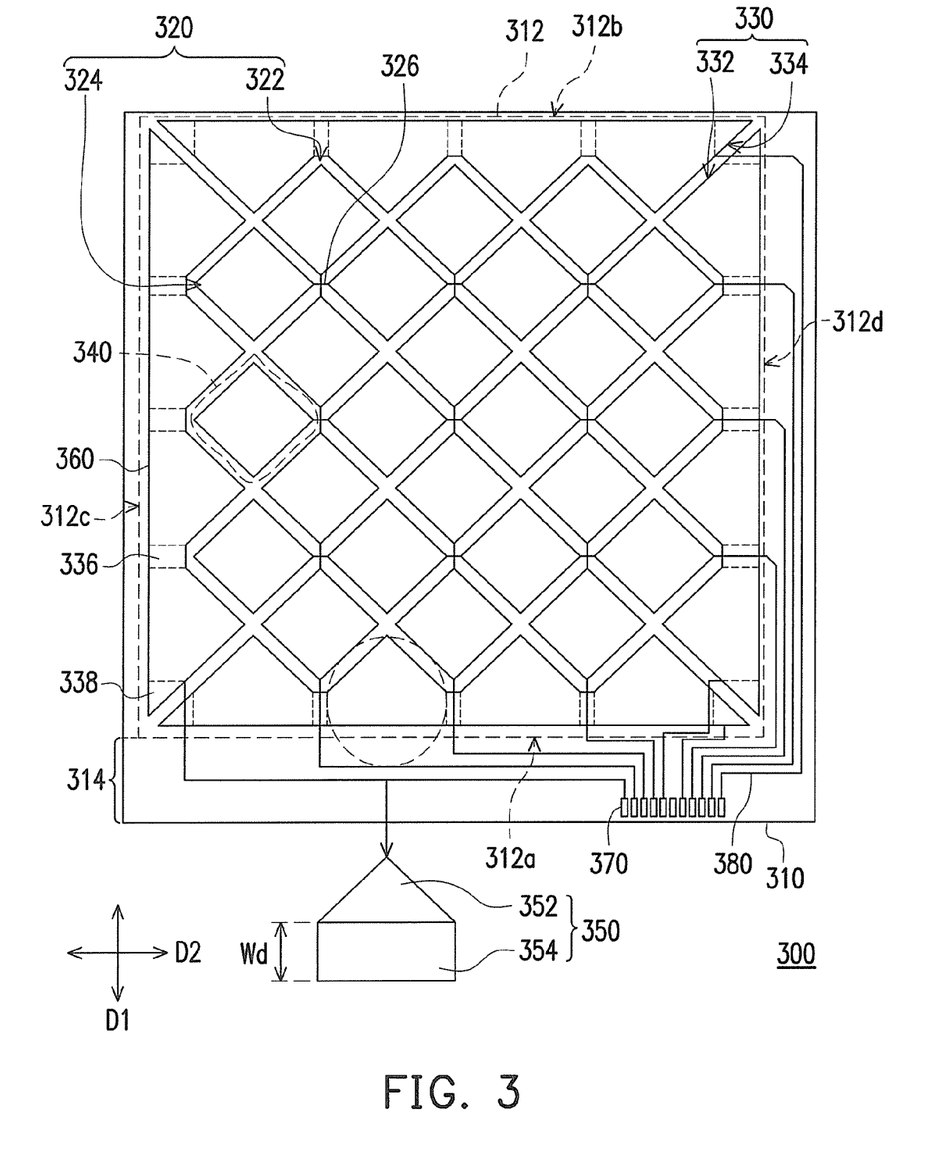
FIG. 3 illustrates a schematic top view of a touch sensing substrate according to an embodiment of the invention.

FIG. 3 illustrates a schematic top view of a touch sensing substrate according to an embodiment of the invention. Referring to FIG. 3, the touch sensing substrate 300 includes a substrate 310 (or named a base substrate) and a touch sensing device (not marked) consisted of a plurality of center sensing series 320 and at least a margin sensing series 330. The substrate 310 has a display area 312 and a peripheral area 314. The peripheral area 314 is located around the display area 312. The center sensing series 320 are disposed corresponding to the display area 312 of the substrate 310. The margin sensing series 330 is disposed along an inner margin of the display area 312.

The center sensing series 320 includes a plurality of first sensing series 322 disposed along a first direction D1 and a plurality of second sensing series 324 disposed along a second direction D2. Each of the center sensing series 320 is formed by a plurality of center sensing electrodes 340 serially connected. The serial connection of the center sensing electrodes 340 is, for example, carried out by connecting the adjacent center sensing electrodes 340 through a plurality of conductive lines 326. Each of the margin sensing series 330 is formed by a plurality of margin sensing electrodes 350 serially connected. The serial connection of the margin sensing electrodes 350 may be carried out by connecting adjacent rectangular outer portions 354 through extending portions 336 extended outward from each rectangular outer portion 354. The serial connection of the center sensing electrodes 340 and that of the margin sensing electrodes 350 are not restricted here. In addition, the terminals of each of the margin sensing series 330 respectively have terminal patterns 338, for example. The shape of the terminal patterns 338 is a triangle, for example, and the terminal patterns 338 are conducive to improve the light transmission evenness of the touch sensing substrate 300 and also improve the sensibility of the margin sensing electrodes 350.

Specifically, the touch sensing substrate 300 further includes a plurality of signal pads 370 and a plurality of signal transmission lines 380. The signal pads 370 are disposed in the peripheral area 314, and the signal transmission lines 380 electrically connect the center sensing series 320 and the margin sensing series 330 respectively to the corresponding signal pads 370. The signal pads 370 are disposed adjacent to a side 312a of the display area 312.

More specifically, each of the margin sensing electrodes 350 includes an inner portion 352 and the rectangular outer portion 354. An area of the inner portion 352 is substantially half of an area of the center sensing electrode 340, and a parallel hemline 360 is formed by the rectangular outer portions 354 serially connected. That is to say, an outer margin of each of the rectangular outer portion 354 away from the corresponding inner portion 352 is a straight line, and the outer margins of the rectangular outer portions 354 of the same margin sensing series 330 are parallel to each other and located at a same extending line.

In the present embodiment, the parallel hemline 360 facilitates the margin of the rectangular outer portion 354 to be parallel to the margin of the display area 312 so that the margin sensing electrodes 350 are not protruded from the display area 312. Therefore, the margin width of the touch sensing substrate 300 is largely reduced to apt to improve the utilization area of the substrate 310. Accordingly, the touch sensing substrate 300 can be used in a flat display panel with the slim border design.

On the other hand, the area of the margin sensing electrodes 350 is similar to the area of the center sensing electrodes 340 in the present embodiment. The sensibility of the margin sensing electrodes 330 is thus substantially equivalent to that of the center sensing electrodes 340 so as to provide for touch sensing. Summarily, the margin sensing electrodes 350 not only facilitates the slim border design, but also increases the amount of the sensing series of the touch sensing substrate 300 by having sufficient sensitivity. Therefore, the dummy electrode patterns incapable of touch sensing disposed for satisfying the light transmission evenness of the touch sensing substrate 300 are not required in the present embodiment. Namely, all the electrode patterns are efficiently used in the present embodiment.

The shape of the inner portion 352 is a triangle which is a half of the center sensing electrode 340. The rectangular outer portion 354 is connected with the base of the triangle. Generally, the more consistent of the area of the margin sensing electrodes 350 and the area of the center sensing electrodes 340 is, the more equivalent of the sensitivity of the margin sensing electrodes 350 and the sensitivity of the center sensing electrodes 340 is. In the present embodiment, the shape of the center sensing electrode 340 is a diamond, for example, and the length of the center sensing electrodes 340 is a. Thus, a width Wd of the rectangular outer portion 354 can be a/2 to $a/2\sqrt{2}$ in each of the margin sensing electrodes 350, wherein the width Wd is defined along the direction perpendicular to the base of the inner portion 352. Accordingly, the area of the rectangular outer portion 354 is substantially equal to or slightly larger than the area of the inner portion 352 to render the margin sensing electrode 350 to have the sensitivity substantially equivalent to the sensitivity of the center sensing electrode 340. In an alternative embodiment, the shapes of the center sensing electrodes 340 can be a hexagon, an octagon, a circle, or the like. The rectangular outer portion 354 of the margin sensing electrode 350 thus can have the shape corresponding to shapes of the center sensing electrodes 340 to facilitate the equal area design.

The margin sensing series 330 includes two first margin sensing series 332 and two second margin sensing series 334 in the present embodiment. The two first margin sensing series 332 are disposed opposite to each other, and the two second margin sensing series 334 are disposed opposite to each other. The first margin sensing series 332 are disposed along the first direction D1, and the second margin sensing series 334 are disposed along the second direction D2. That is to say, the four sides of the display area 312 are configured with the margin sensing series 330.

Nevertheless, it is also adopted that only one second margin sensing series 334 is disposed at another side 312b of the display area 312 opposite to the signal pads 370 in other embodiments. Similarly, the touch sensing substrate 300 may merely have two first margin sensing series 332 located at the right side 312c and the left sides 312c of the display area 312.

In addition, the design of the touch sensing substrate 300 can be that two first margin sensing series 332 and one second margin sensing series 334 are respectively disposed at the sides 312b, 312c, 312d other than the side 312a. Accordingly, the disposition amount of the margin sensing series 330 in the touch sensing substrate 300 can be modified based on the area of the display area 312 and the border design in a real product.

The touch sensing substrate 300 can be incorporated into a flat display panel to form a touch display panel. A material of the margin sensing electrodes 350 is preferably a transparent conductive material to provide desirable light transmission characteristic. Surely, the material of the center sensing electrodes 340 can also be the transparent conductive material. The transparent conductive material includes indium tin oxide (ITO), indium zinc oxide (IZO), or any combination of the foregoing. In a real circumstance, the center sensing electrodes 340 and the margin sensing electrodes 350 can be made by patterning the same transparent conductive film layer. In other words, the present embodiment is conducive to efficiently slim the border of the touch sensing substrate 300 and increase the amount of the touch sensing series without adding any manufacturing process.

Figure 4A:
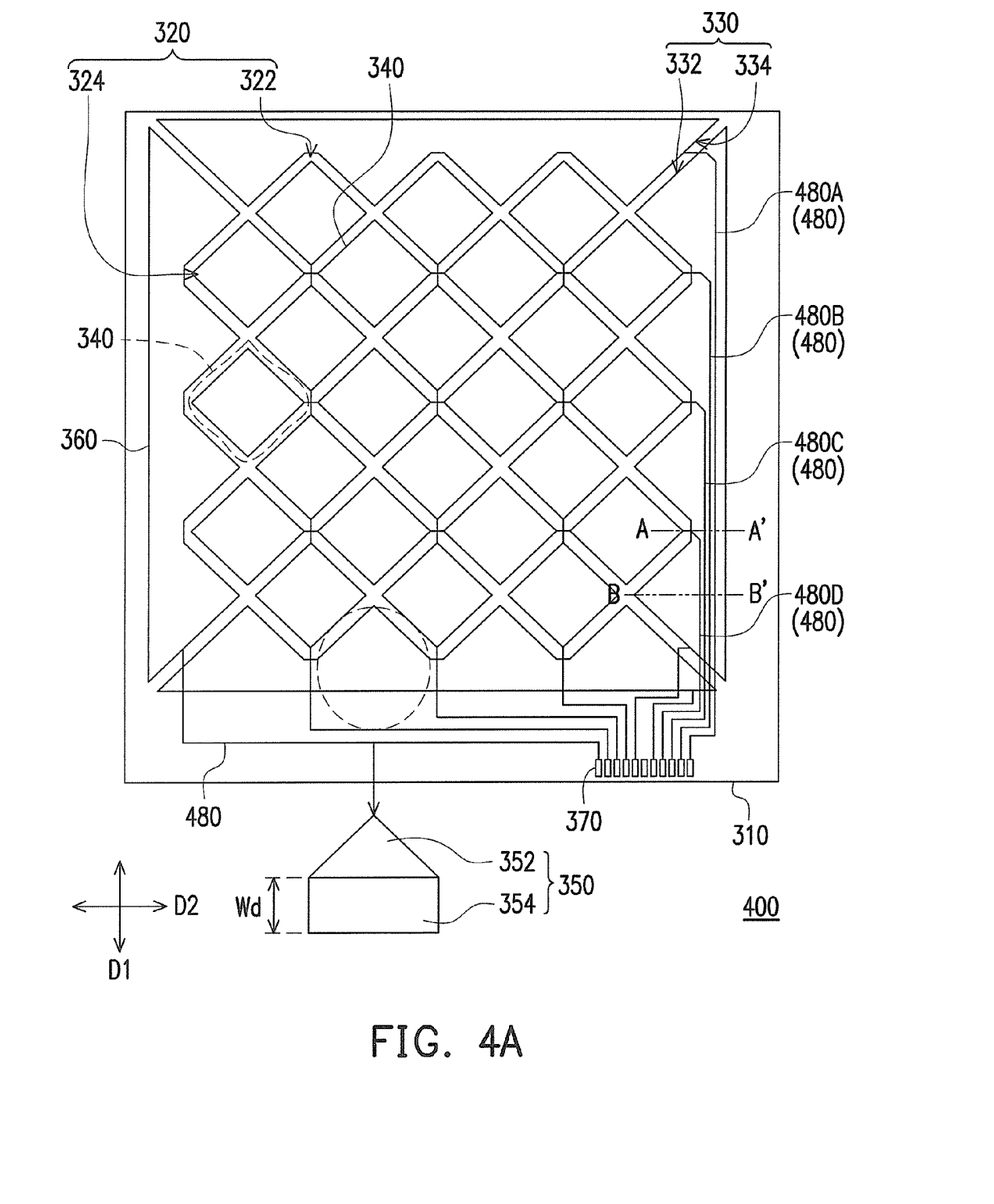
FIG. 4A illustrates a schematic top view of a touch sensing substrate according to another embodiment of the invention.

FIG. 4A illustrates a schematic top view of a touch sensing substrate according to another embodiment of the invention. Referring to FIG. 4A, a touch sensing substrate 400 is similar to the touch sensing substrate 300 mentioned-above in addition to the disposing location of the signal transmission lines 480. That is to say, the margin sensing electrodes 350 of the touch sensing substrate 400 are serially connected to form a parallel hemline 360 so that the margin of the margin sensing electrodes 350 is parallel to the margin of the display area 312. Accordingly, the touch sensing substrate 400 has a slim border design, and all the electrode patterns can be used for touch sensing. The same elements shown in FIGS. 3 and 4A are referred to the same reference number, and they are not repeated here.

In the present embodiment, a part of the transmission lines 480 are disposed between the rectangular outer portions 354 of the margin sensing electrodes 350 and the substrate 310. In FIG. 4A, a part of the signal transmission lines 480 overlap with the first margin sensing series 332, and the signal transmission lines 480 and the first margin sensing series 332 simultaneously extend along the first direction D1. Under such design, the area for disposing the signal transmission lines 480 is reduced to further slim down the border. In particular, the signal transmission lines 480A-480D respectively connect the upper most one second margin sensing series 334 and the second center sensing series 324 to the corresponding signal pads 370.

Figure 4B:
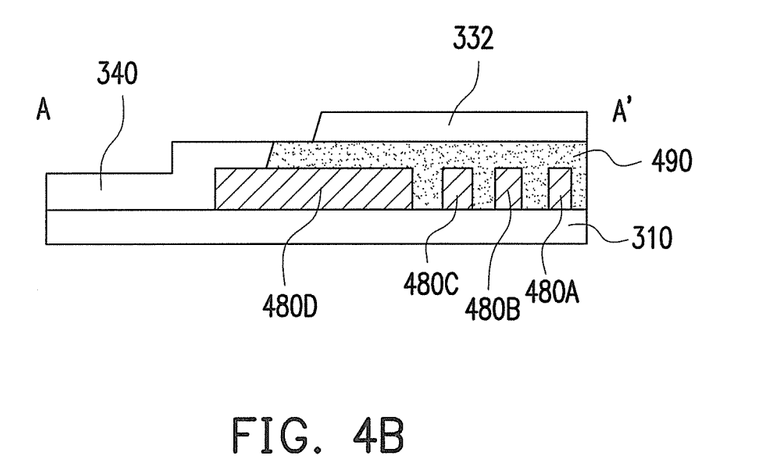
FIG. 4B is a cross-sectional view taken along a line A-A' depicted in FIG. 4A.
Figure 4C:
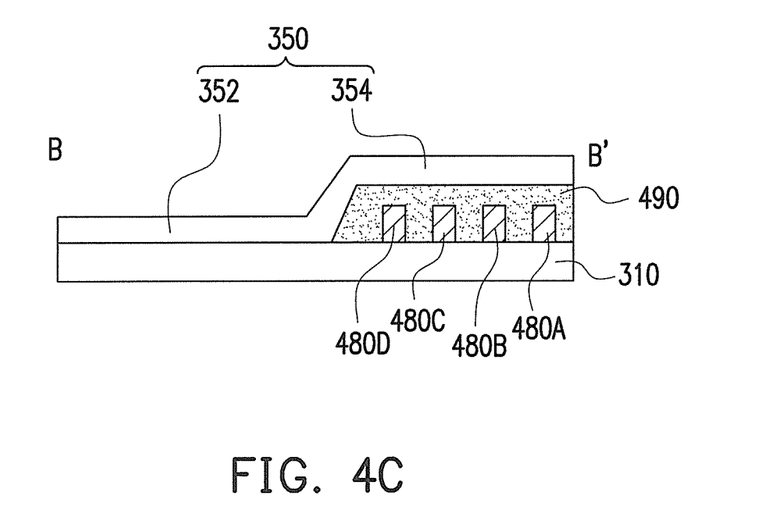
FIG. 4C is a cross-sectional view taken along a line B-B' depicted in FIG. 4A.

For rendering the touch sensing substrate 400 to work properly, the signal transmission lines 480A~480D have to electrically insulate with the first margin sensing series 332. FIG. 4B is a cross-sectional view taken along a line A-A' depicted in FIG. 4A, and FIG. 4B is a cross-sectional view taken along a line B-B' depicted in FIG. 4A. Referring to FIGS. 4A, 4B, and 4C simultaneously, the touch sensing substrate 400 further includes an insulation layer 490 disposed between the signal transmission lines 480A~480D and the right most one first margin sensing series 332. Meanwhile, the insulation layer 490 is disposed between the signal transmission lines 480A~480D and the rectangular outer portions 354 of the margin sensing electrodes 350. Specifically, the signal transmission lines 480A~480D are used for transmitting the signals of the center sensing series 320 so that the upper most one second margin sensing series 334 so that the signal transmission lines 480A~480D are electrically connected to the corresponding center sensing series 320 and the upper most one second margin sensing series 334. For example, the signal transmission line 480D is directed connected to and contacted with one center sensing electrode 340 as shown in FIG. 4B. The insulation layer 490 is able to prevent the shortage of the center sensing series 320 with the margin sensing series 330. In addition, the border is efficiently slimed down under the design of the present embodiment to improve the utility of the touch sensing substrate 400.

Figure 5A:
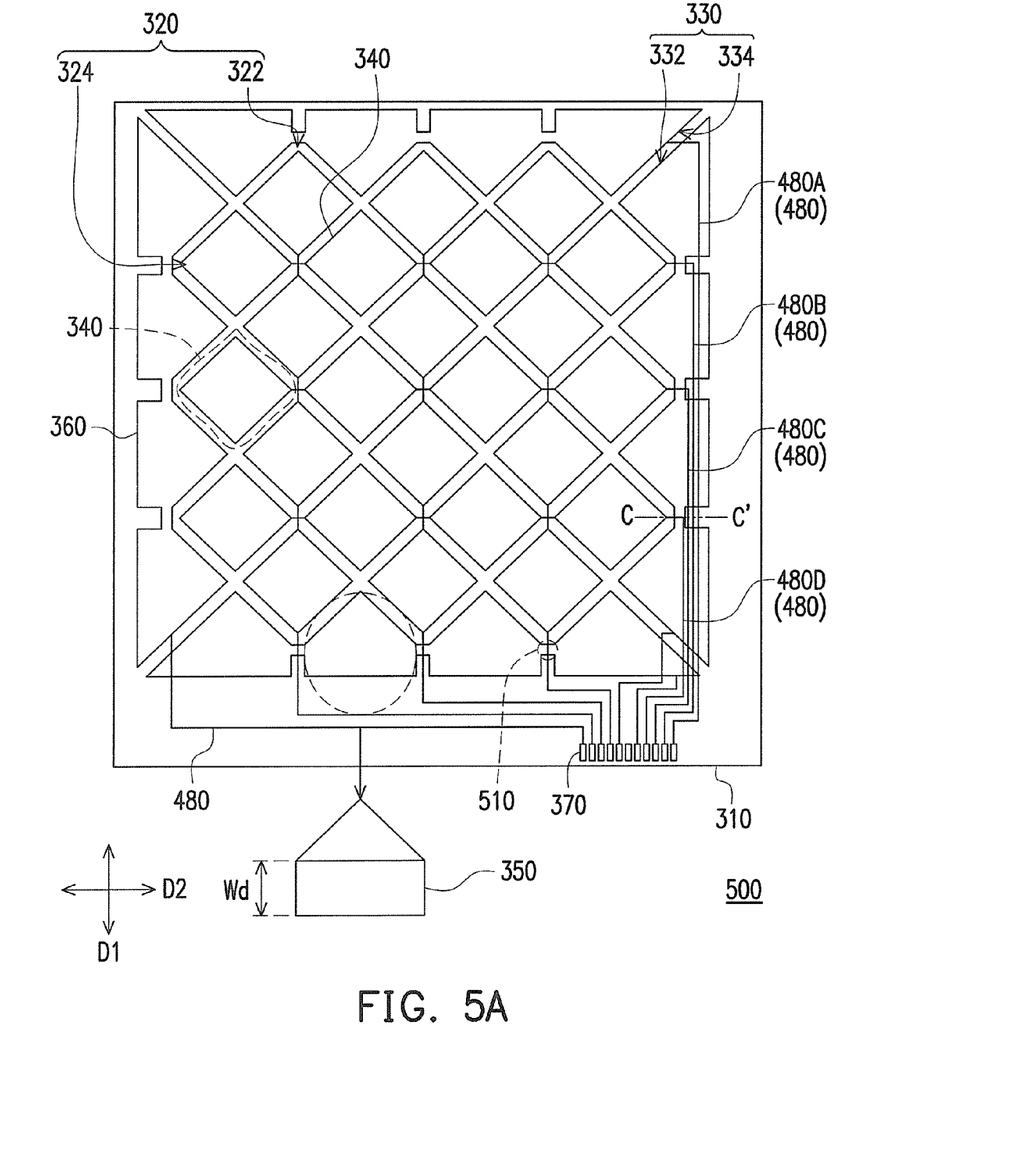
FIG. 5A illustrates a schematic top view of a touch sensing substrate according to further another embodiment of the invention.
Figure 5B:
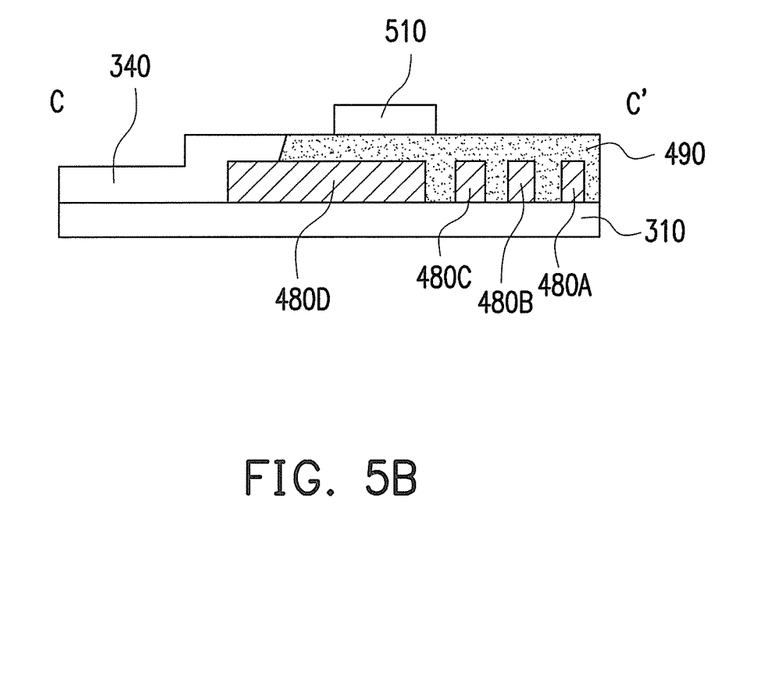
FIG. 5B is a cross-sectional view taken along a line C-C' depicted in FIG. 5A.

FIG. 5A illustrates a schematic top view of a touch sensing substrate according to another embodiment of the invention. FIG. 5B is a cross-sectional view taken along a line C-C' depicted in FIG. 5A. Referring to FIGS. 5A and 5B simultaneously, the difference between a touch sensing substrate 500 and the aforesaid touch sensing substrate 400 is merely that the connecting method of margin sensing electrodes 350, and therefore, the same reference numbers marked in FIGS. 4A and 5A are referred to the same elements. Specifically, the margin sensing electrodes 350 are serially connected through a plurality of connecting patterns 510. The connecting patterns 510 can be made simultaneously with the margins sensing electrodes 350 so that the connecting patterns 510 are transparent conductive patterns. In addition, as shown in FIG. 5B, the insulation layer 490 is disposed between the signal transmission lines 480A~480D (480) and the connecting pattern 510 for maintaining the elements electrically independent from each other.

In summary, the rectangular outer portions of the margins sensing electrodes according to the invention can be arranged to form a parallel hemline such that the margin sensing electrodes do not protrude from the display area. Therefore, the touch sensing device disposed on the touch sensing substrate has slim border. On the other hand, the sensitivity of the margin sensing electrodes is substantially equivalent to the sensitivity of the center sensing electrodes so that the margin sensing electrodes can efficiently perform the touch sensing. That is to say, under the circumstance that the touch sensing substrate of the invention and the conventional touch sensing substrate have the center sensing electrodes in the same size and the display areas in the same area, the touch sensing substrate of the invention has more sensing series relative to the conventional touch sensing substrate. Accordingly, the touch sensing device of the invention applied to the display panel to form a touch display panel can accomplish the slim border design.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch display panel, comprising:
   a flat display panel having a display area and a peripheral area located around the display area; and
   a touch sensing device disposed on the flat display panel, wherein the touch sensing device comprises:
   a plurality of center sensing series being corresponding to the display area of the flat display panel, each of the center sensing series being consisted of a plurality of center sensing electrodes serially connected, wherein the center sensing series comprises a plurality of first sensing series disposed along a first direction and a plurality of second sensing series disposed along a second direction; and
   at least a margin sensing series disposed along a margin of the display area, the at least a margin sensing series being consisted of a plurality of margin sensing electrodes serially connected, and each of the margin sensing electrodes comprising an inner portion and a rectangular outer portion, wherein an area of the inner portion is substantially half of an area of the center sensing electrode, and a parallel hemline is formed by serially connecting the rectangular outer portions, wherein the parallel hemline of the rectangular outer portions is substantially parallel to one of the first direction and the second direction, a shape of each of the center sensing electrodes is a diamond shape, a side length of each of the center sensing electrodes is a, a width of the rectangular outer portion is from $a/2$ to $a/2\sqrt{2}$ in each of the margin sensing electrodes, and the width is substantially perpendicular to a base of the inner portion.

2. The touch display panel as claimed in claim 1, wherein the at least a margin sensing series comprises two first margin sensing series and two second margin sensing series.

3. The touch display panel as claimed in claim 2, wherein the two first margin sensing series are disposed opposite to each other and the two second margin sensing series are disposed opposite to each other.

4. The touch display panel as claimed in claim 1, further comprising a plurality of signal pads and a plurality of signal transmission lines, the signal pads being disposed at the peripheral area, and the signal transmission lines respectively electrically connecting the center sensing series and the at least a margin sensing series to the signal pads.

5. The touch display panel as claimed in claim 1, wherein a part of the signal transmission lines are located in the display area and disposed between the rectangular outer portions of the margin sensing electrodes and the flat display panel.

6. The touch display panel as claimed in claim 5, further comprising an insulation layer disposed between the signal transmission lines and the rectangular outer portions of the margin sensing electrodes.

7. The touch display panel as claimed in claim 1, wherein a material of the margin sensing electrodes is a transparent conductive material.

8. The touch display panel as claimed in claim 7, wherein the transparent conductive material comprises indium tin oxide (ITO), indium zinc oxide (IZO), or any combination of the foregoing.

9. The touch display panel as claimed in claim 1, wherein the flat display panel comprises a liquid crystal display (LCD) panel, a plasma display panel, an organic electro-luminescent display panel, or an electrophoretic display panel.

10. The touch display panel as claimed in claim 1, wherein the flat display panel comprises a first substrate, a display media, and a second substrate, and the display media is sandwiched between the first substrate and the second substrate.

11. The touch display panel as claimed in claim 10, wherein the center sensing electrodes and the margin sensing electrodes are disposed between the display media and the first substrate.

12. The touch display panel as claimed in claim 1, further comprising an auxiliary substrate disposed on the flat display panel, and the center sensing series and the at least a margin sensing series being disposed on the auxiliary substrate.

13. The touch display panel as claimed in claim 12, further comprising an adhesive layer located between the auxiliary substrate and the flat display panel such that the auxiliary substrate is adhered onto the flat display panel.

14. A touch sensing substrate, comprising:
a substrate having a display area and a peripheral area located around the display area; and
a plurality of center sensing series being corresponding to the display area of the substrate, each of the center sensing series being consisted of a plurality of center sensing electrodes serially connected, wherein the center sensing series comprises a plurality of first sensing series disposed along a first direction and a plurality of second sensing series disposed along the second direction; and
at least a margin sensing series disposed along a margin of the display area, the at least a margin sensing series being consisted of a plurality of margin sensing electrodes serially connected, and each of the margin sensing electrodes comprising an inner portion and a rectangular outer portion, wherein an area of the inner portion is substantially half of an area of the center sensing electrode, and a parallel hemline is formed by serially connecting the rectangular outer portions, wherein the parallel hemline of the rectangular outer portions is substantially parallel to one of the first direction and the second direction, a shape of each of the center sensing electrodes is a diamond shape, a side length of each of the center sensing electrodes is a, a width of the rectangular outer portion is from $a/2$ to $a/2\sqrt{2}$ in each of the margin sensing electrodes, and the width is substantially perpendicular to a base of the inner portion.

15. The touch sensing substrate as claimed in claim 14, wherein the at least a margin sensing series comprises two first margin sensing series and two second margin sensing series.

16. The touch sensing substrate as claimed in claim 15, wherein the two first margin sensing series are disposed opposite to each other and the two second margin sensing series are disposed opposite to each other.

17. The touch sensing substrate as claimed in claim 14, further comprising a plurality of signal pads and a plurality of signal transmission lines, the signal pads being disposed at the peripheral area, and the signal transmission lines respectively electrically connecting the center sensing series and the at least a margin sensing series to the corresponding signal pads.

18. The touch sensing substrate as claimed in claim 17, wherein a part of the signal transmission lines are located in the display area and disposed between the rectangular outer portions of the margin sensing electrodes and the substrate.

19. The touch sensing substrate as claimed in claim 18, further comprising an insulation layer disposed between the signal transmission lines and the rectangular outer portions of the margin sensing electrodes.

20. The touch sensing substrate as claimed in claim 14, wherein a material of the margin sensing electrodes is a transparent conductive material.

21. The touch sensing substrate as claimed in claim 20, wherein the transparent conductive material comprises indium tin oxide (ITO), indium zinc oxide (IZO), or any combination of the foregoing.

22. A touch sensing substrate, comprising:
a substrate having a display area and a peripheral area located around the display area; and
a plurality of center sensing series being corresponding to the display area of the substrate, each of the center sensing series being consisted of a plurality of center sensing electrodes serially connected, wherein the center sensing series comprises a plurality of first sensing series disposed along a first direction and a plurality of second sensing series disposed along the second direction; and at least a margin sensing series disposed along a margin of the display area, the at least a margin sensing series being consisted of a plurality of margin sensing electrodes serially connected, and each of the margin sensing electrodes comprising an inner portion and a rectangular outer portion, wherein an area of the inner portion is substantially half of an area of the center sensing electrode, an area of the rectangular outer portion is substantially equal to the area of the inner portion, and a parallel hemline is formed by serially connecting the rectangular outer portions, wherein the parallel hemline of the rectangular outer portions is substantially parallel to one of the first direction and the second direction, and the width is substantially perpendicular to a base of the inner portion.

* * * * *